United States Patent
Park

(10) Patent No.: US 11,906,584 B2
(45) Date of Patent: Feb. 20, 2024

(54) SIMULATION METHOD AND SYSTEM OF VERIFYING OPERATION OF SEMICONDUCTOR MEMORY DEVICE OF MEMORY MODULE AT DESIGN LEVEL

(71) Applicant: Samsung Electronics Co., Ltd., Suwon-si (KR)

(72) Inventor: Seaeun Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 17/838,298

(22) Filed: Jun. 13, 2022

(65) Prior Publication Data

US 2023/0097405 A1    Mar. 30, 2023

(30) Foreign Application Priority Data

Sep. 29, 2021    (KR) .......................... 10-2021-0128674

(51) Int. Cl.
*G01R 31/3183*    (2006.01)
*G06F 30/31*    (2020.01)
*G06F 119/02*    (2020.01)

(52) U.S. Cl.
CPC ..... *G01R 31/318357* (2013.01); *G06F 30/31* (2020.01); *G06F 2119/02* (2020.01)

(58) Field of Classification Search
CPC ............. G01R 31/318357; G06F 30/31; G06F 2119/02; G06F 30/33; G06F 2111/20; G06F 2115/12; G06F 30/333; G06F 2119/12

See application file for complete search history.

(56) References Cited

U.S. PATENT DOCUMENTS

| | | | |
|---|---|---|---|
| 7,457,176 B2 | 11/2008 | Dono | |
| 9,223,915 B1* | 12/2015 | Ginetti | G06F 30/367 |
| 9,666,263 B2* | 5/2017 | Hanson | G11C 16/32 |
| 10,643,018 B1* | 5/2020 | Zhang | G06F 30/398 |
| 10,747,930 B2 | 8/2020 | Chou et al. | |
| 10,755,012 B2 | 8/2020 | Muthiah et al. | |

(Continued)

FOREIGN PATENT DOCUMENTS

| | | |
|---|---|---|
| JP | 2000206209 A | 7/2000 |
| JP | 6821989 B2 | 1/2021 |

OTHER PUBLICATIONS

"DDR4 simulation guidelines", Jun. 25, 2019, https://community.intel.com/t5/FPGA-Wiki/DDR4-simulation-guidelines/ta-p/735404.*

*Primary Examiner* — Nha T Nguyen
(74) *Attorney, Agent, or Firm* — Muir Patent Law, PLLC

(57) ABSTRACT

A simulation method and system of verifying an operation of a semiconductor memory device of a memory module at a design level. The simulation method includes setting a configuration and an arrangement of a registered clock driver (RCD) and a configuration and an arrangement of first semiconductor memory devices to fourth semiconductor memory devices, on a printed circuit board (PCB) through a graphic user interface (GUI). When a RCD test execution command is applied through the GUI, executing a test program to apply control signals to control signal terminals of the PCB based on a command truth table, to compare the applied control signals and control signals output through first driver output terminals of the RCD, and to create an RCD test result. When the RCD operates normally, performing a test on the memory module.

18 Claims, 16 Drawing Sheets

(56) References Cited

U.S. PATENT DOCUMENTS

| | | | |
|---|---|---|---|
| 10,997,332 B1* | 5/2021 | Kukal | G06F 30/392 |
| 11,740,284 B1* | 8/2023 | Chokhani | G01R 31/318342 |
| | | | 716/136 |
| 11,777,766 B2* | 10/2023 | Jang | H04L 25/03057 |
| | | | 375/233 |
| 2013/0182489 A1* | 7/2013 | Wang | G11C 11/24 |
| | | | 365/200 |
| 2014/0032984 A1* | 1/2014 | Lee | G11C 29/56 |
| | | | 714/718 |
| 2018/0129767 A1 | 5/2018 | Akkaraju et al. | |
| 2018/0341724 A1* | 11/2018 | Sugahara | G06F 30/3323 |
| 2020/0184034 A1* | 6/2020 | Christo | G06F 30/10 |
| 2021/0103510 A1 | 4/2021 | Pena et al. | |
| 2022/0404412 A1* | 12/2022 | Van Den Eijnden | |
| | | | G01R 31/2803 |

* cited by examiner

FIG. 9

| COMMAND | CS11(CS12, CS21,CS22) | ca11(ca12,ca21,ca22) | | | | | | | CK11(CK12, CK21,CK22) |
|---|---|---|---|---|---|---|---|---|---|
| | | ca0 | ca1 | ca2 | ca3 | ca4 | ... | ca13 | |
| REF | L | H | H | L | H | H | | | ↑ |
| PREA | L | H | H | L | H | L | | | ↑ |
| REF | L | H | H | L | H | H | | | ↑ |
| DES | H | X | X | X | X | X | | | ↑ |
| ⋮ | | | | | | | | | |
| ACT | L | L | L | | | | | | ↑ |
| | H | | | | | | | | ↑ |
| WR | L | H | L | H | H | L | | | ↑ |
| | H | | | | | | | | ↑ |
| RD | L | H | L | H | H | H | | | ↑ |
| | H | | | | | | | | ↑ |
| MRW | L | H | L | H | L | L | | | ↑ |
| | H | | | | | | | | ↑ |
| ⋮ | | | | | | | | | |

FIG. 12A

|  | 7BITS | | | | | | | 7BITS | | | | | | |
|---|---|---|---|---|---|---|---|---|---|---|---|---|---|---|
| CA1 | 0 | 0 | 0 | 1 | 0 | 0 | 0 | 0 | 1 | 0 | 0 | 0 | 0 | 1 |

NORMAL ↓

| ca11 | 0 | 0 | 0 | 1 | 0 | 0 | 0 | 0 | 1 | 0 | 0 | 0 | 0 | 1 |
|---|---|---|---|---|---|---|---|---|---|---|---|---|---|---|

FIG. 12B

| CA2 | 0 | 0 | 0 | 1 | 0 | 0 | 0 | 0 | 1 | 0 | 0 | 0 | 0 | 1 |
|---|---|---|---|---|---|---|---|---|---|---|---|---|---|---|

MIRROR ↓

| ca12 | 0 | 0 | 1 | 0 | 0 | 0 | 0 | 0 | 0 | 1 | 0 | 0 | 1 | 0 |
|---|---|---|---|---|---|---|---|---|---|---|---|---|---|---|

FIG. 12C

| CA1 | 0 | 0 | 0 | 1 | 0 | 0 | 0 | 0 | 1 | 0 | 0 | 0 | 0 | 1 |
|---|---|---|---|---|---|---|---|---|---|---|---|---|---|---|

INVERSION ↓

| ca21 | 1 | 1 | 1 | 0 | 1 | 1 | 1 | 1 | 0 | 1 | 1 | 1 | 1 | 0 |
|---|---|---|---|---|---|---|---|---|---|---|---|---|---|---|

FIG. 12D

| CA2 | 0 | 0 | 0 | 1 | 0 | 0 | 0 | 0 | 1 | 0 | 0 | 0 | 0 | 1 |
|---|---|---|---|---|---|---|---|---|---|---|---|---|---|---|

MIRROR_INVERSION ↓

| ca22 | 1 | 1 | 0 | 1 | 1 | 1 | 1 | 1 | 0 | 1 | 1 | 1 | 0 | 1 |
|---|---|---|---|---|---|---|---|---|---|---|---|---|---|---|

FIG. 14

| | | | | | | | 46 |
|---|---|---|---|---|---|---|---|
| SWD | SMCA | SWD | SMCA | . . . | SMCA | — MBLK |
| CJ | SA | CJ | SA | . . . | SA | — SBLK |
| SWD | SMCA | SWD | SMCA | . . . | SMCA | — MBLK |
| CJ | SA | CJ | SA | . . . | SA | — SBLK |
| . | . | . | . | . | . | |
| . | . | . | . | . | . | |
| . | . | . | . | . | . | |
| SWD | SMCA | SWD | SMCA | . . . | SMCA | — MBLK |

FIG. 15

| caip | mirp | OPERATION OF COMMAND AND ADDRESS DECODER |
|---|---|---|
| VSS | VSS | NORMAL |
| VSS | VDD | MIRROR |
| VDD | VSS | INVERSION |
| VDD | VDD | MIRROR_INVERSION |

SIMULATION METHOD AND SYSTEM OF VERIFYING OPERATION OF SEMICONDUCTOR MEMORY DEVICE OF MEMORY MODULE AT DESIGN LEVEL

CROSS-REFERENCE TO THE RELATED APPLICATION

This application claims priority under 35 U.S.C. § 119 to Korean Patent Application No. 10-2021-0128674, filed on Sep. 29, 2021, in the Korean Intellectual Property Office, the disclosure of which is incorporated herein by reference in its entirety.

BACKGROUND

1. Field

The present disclosure relates to simulation methods and systems for verifying an operation of a semiconductor memory device of a memory module at a design level.

2. Description of the Related Art

A memory module includes a module printed circuit board, and a registered clock driver and a plurality of semiconductor memory devices mounted on the module printed circuit board.

Before being assembled into a memory module, each of the plurality of semiconductor memory devices is a device verified to perform a normal operation by performing a test (for example, cell and core function test) after packaging. Further, after the plurality of semiconductor memory devices are tested and assembled into the memory module, the memory module may be tested to determine whether the plurality of semiconductor memory devices perform the normal operation.

SUMMARY

The exemplary embodiments of the disclosure provide simulation methods and systems capable of verifying an operation of a semiconductor memory device of a memory module at a design level before semiconductor memory devices are assembled into the memory module.

Objects of embodiments of the present disclosure are not limited to the aforementioned objects, and other unmentioned objects will be clearly understood by those skilled in the art based on the following description of the disclosure.

In accordance with an embodiment of the disclosure, a simulating method comprises: loading a design file of a printed circuit board (PCB), a design file of a registered clock driver (RCD), a design file of a semiconductor memory device, a design file of a memory module, and a test program, through a graphical user interface (GUI); setting a configuration and an arrangement of the RCD based on the design file of the RCD, and a configuration and an arrangement of first semiconductor memory devices to fourth semiconductor memory devices, based on the design file of the semiconductor memory device, on the PCB, through the GUI; setting a connection between board control signal terminals of the PCB and driver input terminals of the RCD, a connection between first board control output terminals of the PCB and first driver output terminals of the RCD, a connection between second board control output terminals of the PCB and second driver output terminals of the RCD, a connection between third board control output terminals of the PCB and third driver output terminals of the RCD, and a connection between fourth board control output terminals of the PCB and fourth driver output terminals of the RCD, through the GUI; in response to a RCD test execution command applied through the GUI, executing the test program to apply control signals to control signal terminals of the PCB based on a command truth table for test, to compare the applied control signals and control signals output through first driver output terminals of the RCD, and to create an RCD test result; and in response to the RCD test result indicating that the RCD operates normally, performing a test on the memory module.

In accordance with an embodiment of the disclosure, a simulation system comprises: a processor configured to execute a simulation program when a simulation program execution command is applied, and create a graphical user interface (GUI); a storage configured to store a design file of a printed circuit board (PCB), a design file of a registered clock driver (RCD), and a design file of a semiconductor memory device, a design file of a memory module, and a command truth table file; a main memory configured to load the simulation program; and a display configured to display the GUI, wherein the processor loads the design file of the PCB, the design file of the RCD, and the design file of the semiconductor memory device to the main memory, in response to the design file of the PCB, the design file of the RCD, and the design file of the semiconductor memory device, the design file of the memory module, and a test program, stored in the storage, being selected through the GUI, wherein the processor creates the memory module for testing the RCD, in response to a configuration and an arrangement of the RCD based on the design file of the RCD, and a configuration and an arrangement of first semiconductor memory devices to fourth semiconductor memory devices based on the design file of the semiconductor memory device on the PCB, being set, and a connection between board control signal terminals of the PCB and driver input terminals of the RCD, a connection between first board control output terminals of the PCB and first driver output terminals of the RCD, a connection between second board control output terminals of the printed circuit board and second driver output terminals of the RCD, a connection between third board control output terminals of the PCB and third driver output terminals of the RCD, and a connection between fourth board control output terminals of the PCB and fourth driver output terminals of the RCD, being set, through the GUI; and wherein the processor executes the test program to apply control signals to control signal terminals of the PCB based on the command truth table, to compare the applied control signals and control signals output through first driver output terminals of the RCD, and to create an RCD test result, in response to a RCD test execution command being applied through the GUI.

BRIEF DESCRIPTION OF THE DRAWINGS

FIG. 9 is a command truth table of a semiconductor memory device according to an embodiment of the inventive concept.

FIGS. 12A to 12D are diagrams illustrating a first command and address, a second command and address, a normal memory command and address, a mirror memory command and address, an inversion memory command and address, and a mirror_inversion memory command and address according to an embodiment of the inventive concept.

FIG. 14 is a diagram illustrating an arrangement of a memory cell array according to an embodiment of the inventive concept.

FIG. 15 is a table for describing an operation of a command and address decoder of a semiconductor memory device according to an embodiment of the inventive concept.

DETAILED DESCRIPTION OF EXEMPLARY EMBODIMENTS

Hereinafter, a simulation method and system of verifying an operation of a semiconductor memory device of a memory module at a design level according to embodiments of the inventive concept will be described with reference to the accompanying drawings.

Figure 1:
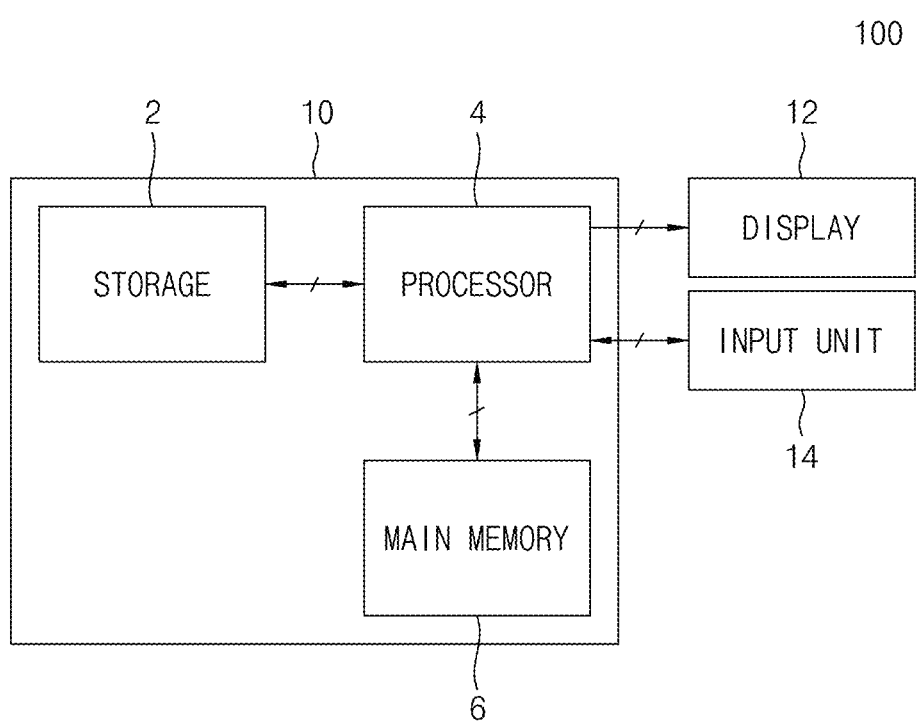
FIG. 1 is a block diagram illustrating a simulation system according to an embodiment of the inventive concept.

FIG. 1 is a block diagram illustrating a simulation system according to an embodiment of the inventive concept. A simulation system 100 may include a body 10, a display 12, and an input unit 14. The body 10 may include a storage 2, a processor 4, and a main memory 6.

Referring to FIG. 1, the storage 2 may store a simulation program, a test program file of a memory module, design files (for example, a circuit design drawing including an inner design drawing (including signal lines, transistors, logic gates, inner nodes, and terminals (for example, pads)), etc., and an outer drawing file (an appearance drawing including outer terminals (for example, pins or balls)) of each of the components (for example, a printed circuit board (PCB) and a semiconductor memory device, etc.) included in the memory module, and a command truth table file for test.

The processor 2 may create a graphical user interface (GUI) in response to a simulation program execution command, create a memory module for test based on a configuration, an arrangement, and a connection setting of each of the components of the memory module selected through the GUI, execute the test program in response to a test program execution command to perform a test (for example, a test on operations of semiconductor memory devices), and provide a test result.

The main memory 6 may load the simulation program, the test program, and the design file of each of the components.

The display 12 may display the GUI.

The input unit 14 may input the simulation program execution command, and input setting inputs for various settings and the test program execution command through the GUI.

Figure 2:
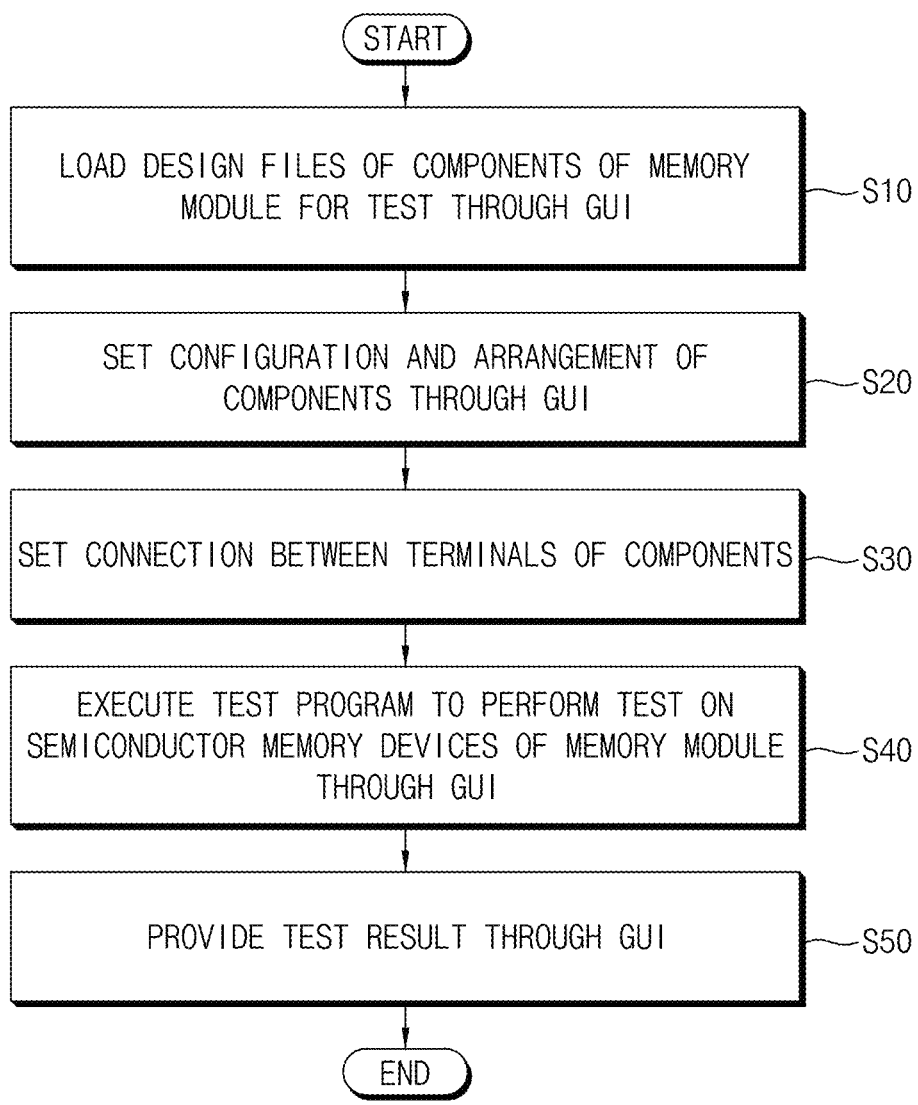
FIG. 2 is a flowchart for describing a simulation method according to an embodiment of the inventive concept.

FIG. 2 is a flowchart for describing a simulation method according to an embodiment of the inventive concept.

Referring to FIG. 2, design files of components of a memory module for test may be loaded through a GUI (S10) of a software system (e.g., a simulator software program or a hardware compiler software program).

A configuration and an arrangement of the components on a PCB may be set through the GUI (S20). Further, terminals or inner nodes related to a test result may be set through the GUI.

A connection between terminals of the PCB and terminals of the components may be set through the GUI (S30).

A test on the memory module is performed by executing the test program through the GUI (S40). For example, the test on the memory module may include applying test pattern data to board data terminals of the PCB, performing a write operation of writing the test pattern data to the semiconductor memory devices, performing a read operation of reading data written to the semiconductor memory devices, comparing the test pattern data and read data output through memory data terminals of the semiconductor memory devices or read data of inner nodes of the semiconductor memory devices during the read operation, and creating a test result.

The test result is provided through the GUI (S50).

Figure 3:
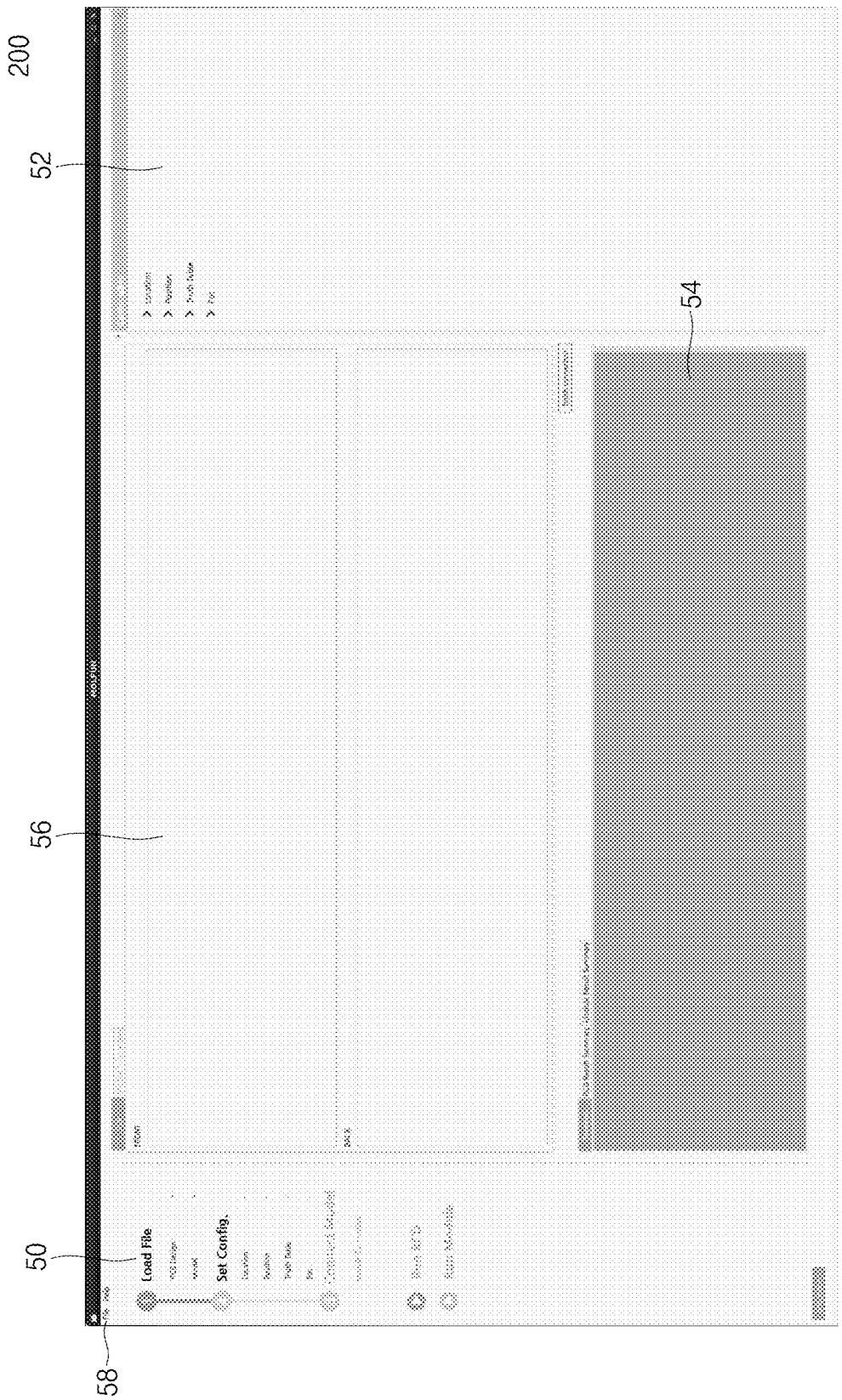
FIG. 3 is a drawing illustrating a graphic user interface according to an embodiment of the inventive concept.

FIG. 3 is a drawing illustrating a graphic user interface according to an embodiment of the inventive concept.

Referring to FIG. 3, the GUI 200 may include a step monitor window 50 for displaying a simulation execution progress step, a configuration window 52 for setting a configuration and an arrangement of a memory module for test, a result window 54 for displaying a test result, a main window 56 for displaying the configuration and the arrangement of the memory module and setting and displaying a connection of the memory module, and a menu bar 58 for fetching and storing a file.

Figure 4A:
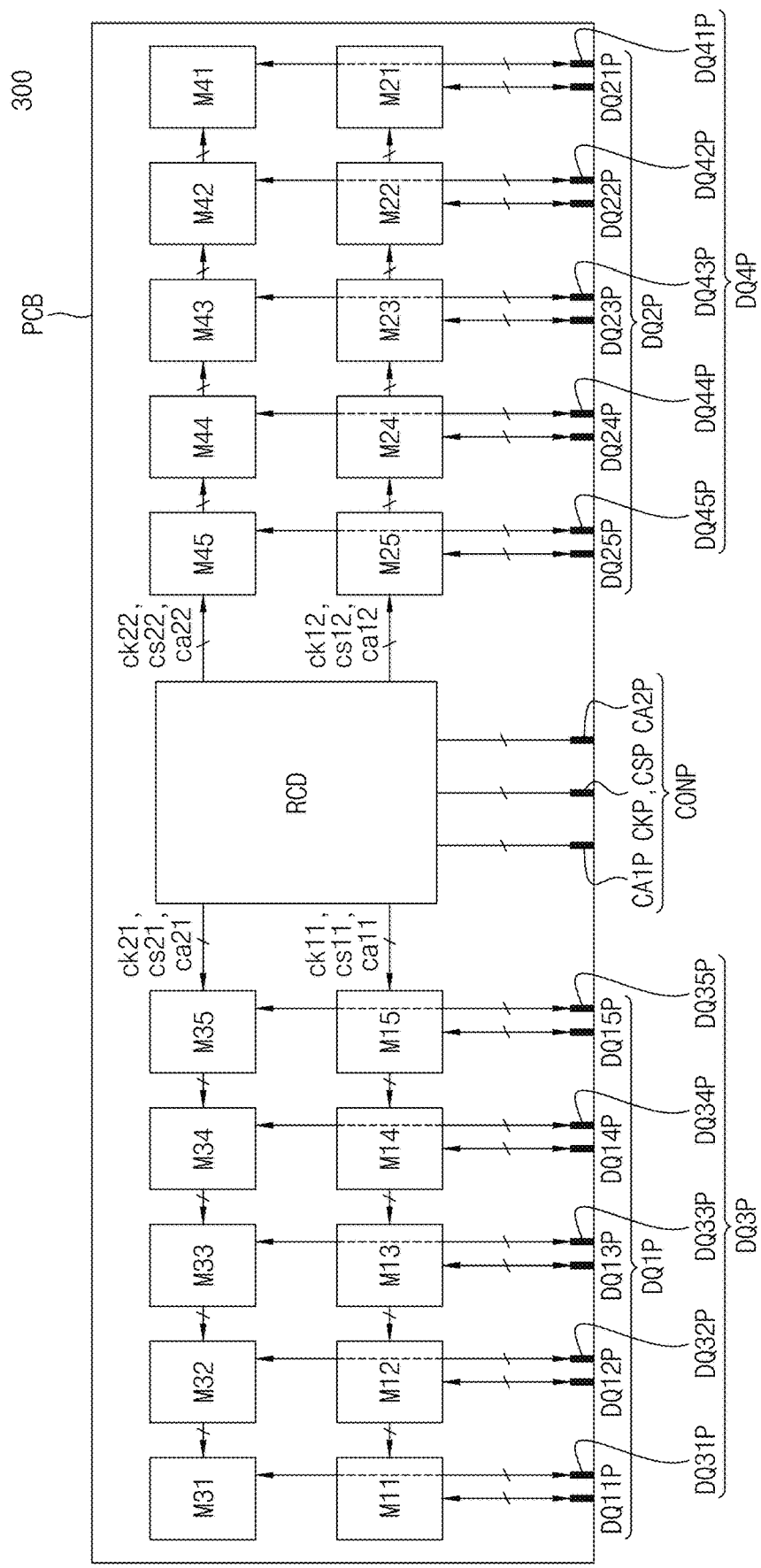
FIGS. 4A and 4B are drawings illustrating configurations of a memory module for test according to an embodiment of the inventive concept.

FIG. 4A is a drawing illustrating a configuration of a memory module for test according to an embodiment of the inventive concept. A memory module 300 may include a PCB, a registered clock driver (RCD), first semiconductor memory devices M11 to M15, second semiconductor memory device M21 to M25, third semiconductor memory devices M31 to M35, and fourth semiconductor memory devices M41 to M45. Memory module 300 may also include first data terminals DQ1P (DQ11P to DQ15P), second data terminals DQ2P (DQ21P to DQ25P), third data terminals DQ3P (DQ31P to DQ35P), and fourth data terminals DQ4P (DQ41P to DQ45P). Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Figure 4B:
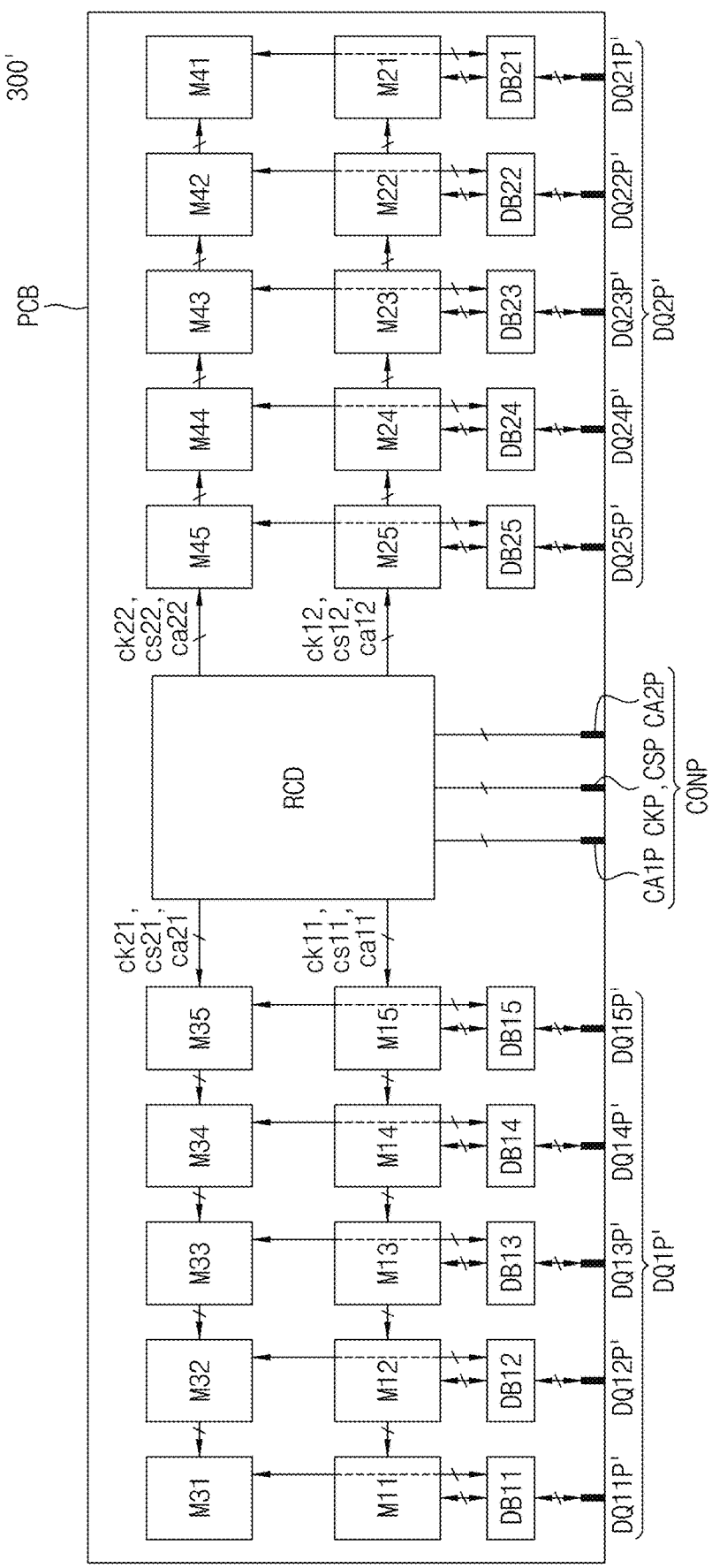

FIG. 4B is a diagram illustrating a configuration of a memory module for test according to an embodiment of the inventive concept. Similar to memory module 300, memory module 300' may include a PCB, a RCD, first semiconductor memory devices M11 to M15, second semiconductor memory device M21 to M25, third semiconductor memory devices M31 to M35, and fourth semiconductor memory devices M41 to M45. Memory module 300' may also include first data buffers DB11 to DB15 and second data buffers DB21 to DB25. Memory module 300' may further include first data terminals DQ1P' (DQ11P' to DQ15P') instead of first data terminals DQ1P and second data terminals DQ2P of memory module 300 shown in FIG. 4A and second data terminals DQ2P' (DQ21P' to DQ25P') instead of third data terminals DQ3P and fourth data terminals DQ4P of memory module 300 shown in FIG. 4A.

The memory module 300 shown in FIG. 4A may be a registered dual in-line memory module (RDIMM), and the memory module 300' shown in FIG. 4B may be a load reduced DIMM (LRDIMM). Although not shown, the memory module 300 or 300' may further include other components (for example, a serial presence detector (SPD), a power management unit (PMIC), a temperature sensor (TS), etc.).

The memory module for test according to an embodiment of the inventive concept may include a DIMM, a hypercloud DIMM (HDIMM), and a non-volatile DIMM (NVDIMM) in addition to the above-described memory modules.

Figure 5:
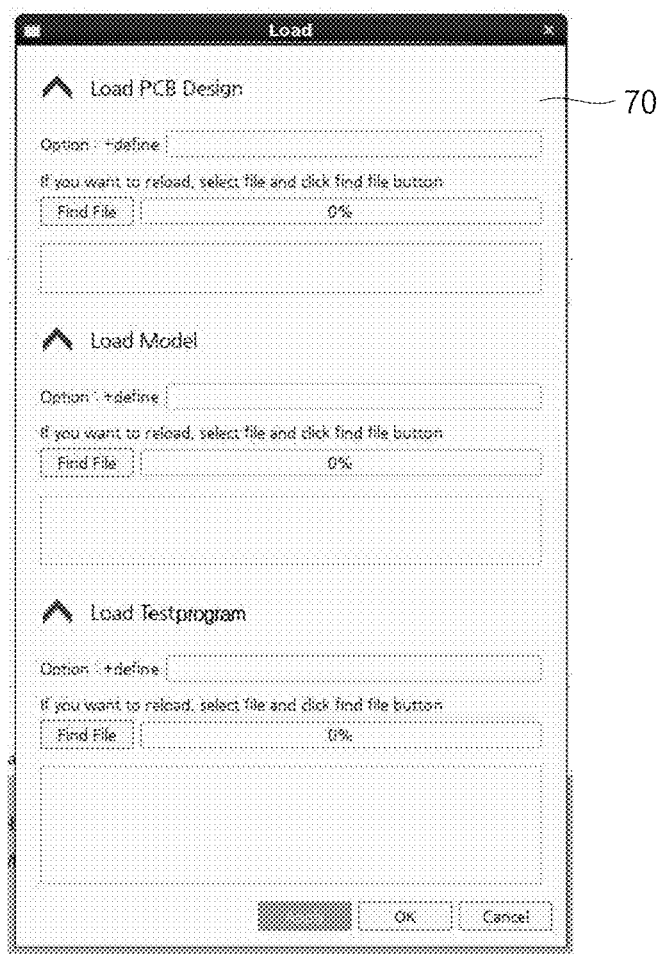
FIG. 5 is a diagram for describing loading design files of components of a memory module through a graphic user interface according to an embodiment of the inventive concept.

FIG. 5 is a diagram for describing loading design files of components of a memory module through a GUI according to an embodiment of the inventive concept.

Referring to FIGS. 1 to 5, when selecting a load file menu in a file menu of a menu bar 58 for testing the memory module 300 shown in FIG. 4A, a load file window 70 may be created. A design file of a PCB, a design file of an RCD, a design file of a semiconductor memory device, and a test program stored in the storage 2 may be selected using the load file window 70. And then, the processor 4 may load the selected files and the test program to the main memory 6. When a load file step is completed, a color of the load file step Load File in the step monitor window 50 may be changed.

Figure 6:
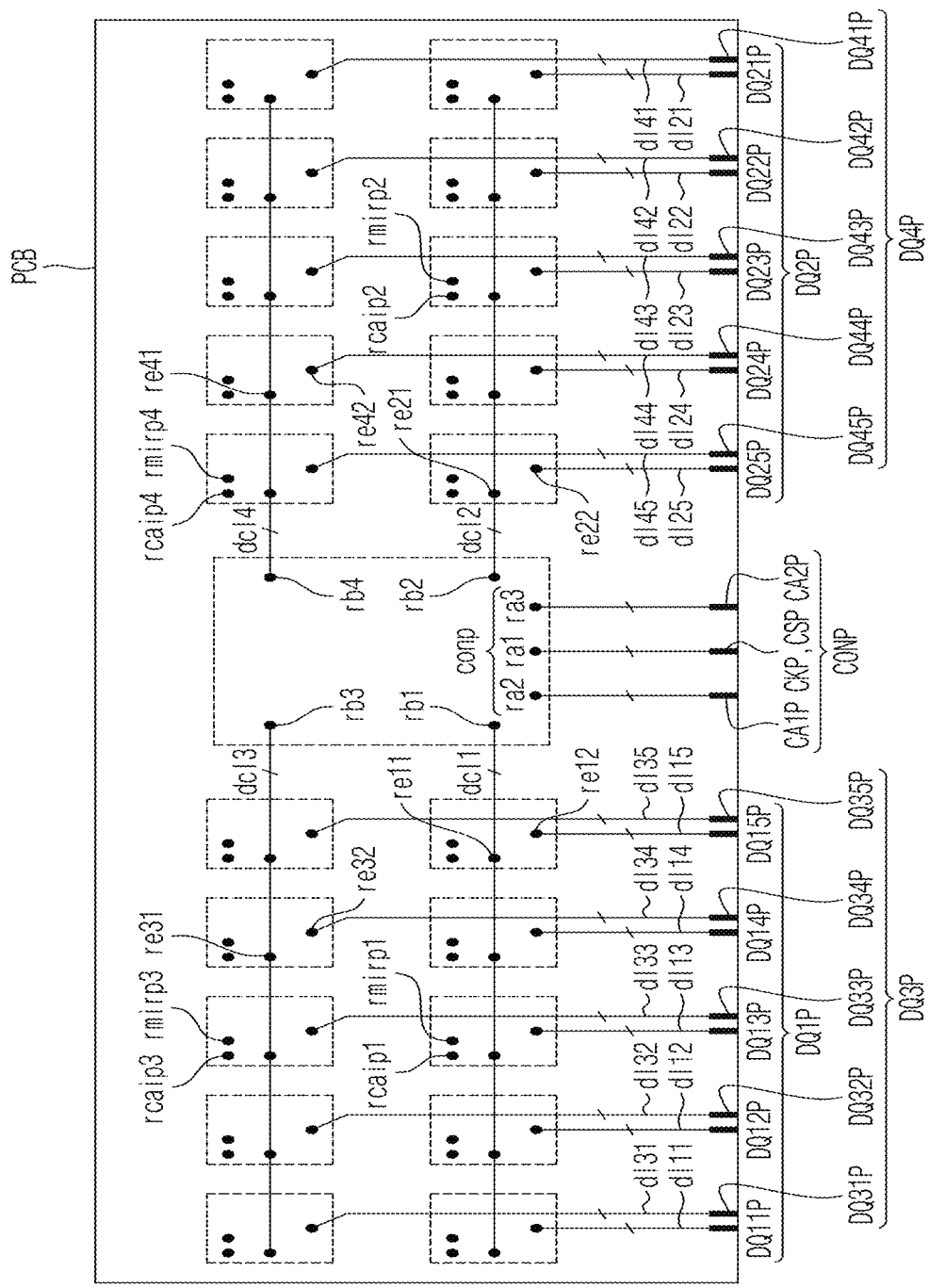
FIG. 6 is a schematic diagram illustrating a printed circuit board included in a design file of a printed circuit board according to an embodiment of the inventive concept.

FIG. 6 is a schematic diagram of a PCB included in a design file of a PCB according to an embodiment of the inventive concept.

Referring to FIG. 6, the PCB may include control signal terminals CONP (a clock signal terminal CKP, first and second chip selection signal terminals CSP, first command and address terminals CA1P, second command and address terminals CA2P, and data terminals (first data terminals DQ1P and second data terminals DQ2P) arranged in one end. The first data terminals DQ1P may include DQ11P to DQ15P, the second data terminals DQ2P may include DQ21P to DQ25P, the third data terminals DQ3P may include DQ31P to DQ35P, and the fourth data terminals may include DQ41P to DQ45P.

Further, the PCB may include board control signal input terminals conp, first board control signal output terminals rb1 to fourth control signal output terminals rb4 for the RCD connected to control signal terminals CONP, and first module control signal input terminals re11 and first module data terminals re12 for each of the first semiconductor memory devices M11 to M15 to fourth module control signal terminals re41 and fourth module data terminals re42 for each of the fourth semiconductor memory devices M41 to M45, arranged in a front surface of the PCB. The PCB may include a first module inversion command and address terminals rcaip1 and a first module mirror command and address terminal rmirp1 for the first semiconductor memory devices M11 to M15 to a fourth module inversion command and address terminals rcaip4 and a fourth module mirror command and address terminals rmirp4 for the fourth semiconductor memory devices M41 to M45, arranged in the front surface of the PCB. The PCB may include signal lines dl11 to dl15 for connecting the first module data terminals re12 for each of the first semiconductor memory devices M11 to M15 to the first data terminals DQ11P to DQ15P, respectively, signal lines dl31 to dl35 for connecting third module data terminals re32 for each of the third semiconductor memory devices M31 to M35 to the third data terminals DQ31P to DQ35P, respectively, signal lines dl21 to dl25 for connecting second module data terminals re22 for each of the second semiconductor memory devices M21 to M25 to the second data terminals DQ21P to DQ25P, respectively, and signal lines dl41 to dl45 for connecting the fourth module data terminals re42 for each of the fourth semiconductor memory devices M41 to M45 to the fourth data terminals DQ41P to DQ45P, respectively. The PCB may include signal lines dcl1 for commonly connecting the first board control signal output terminals rb1 and the first module control signal input terminals re11, signal lines dcl2 for commonly connecting the second board control signal output terminals rb2 and the second module control signal input terminals re21, signal lines dcl3 for commonly connecting the third board control signal output terminals rb3 and the third module control signal input terminals re31, and signal lines dcl4 for commonly connecting the fourth board control signal output terminals rb4 and the fourth module control signal input terminals re41.

Although not shown, fifth semiconductor memory devices to eighth semiconductor memory devices may be arranged in a rear surface of the PCB and at positions corresponding to the first semiconductor memory devices M11 to M15 to the fourth semiconductor memory devices M41 to M45. The signal lines dl11 to dl15 and the first data terminals DQ1P may be shared by the first semiconductor memory devices M11 to M15 and the fifth semiconductor memory devices, the signal lines dl21 to dl25 and the second data terminals DQ2P may be shared by the second semiconductor memory devices M21 to M25 and the sixth semiconductor memory devices, the signal lines dl31 to dl35 and the third data terminals DQ3P may be shared by the third semiconductor memory devices M31 to M35 and the seventh semiconductor memory devices, and the signal lines dl41 to dl45 and the fourth data terminals DQ4P may be shared by the fourth semiconductor memory devices M41 to M45 and the eighth semiconductor memory devices.

Figure 7:
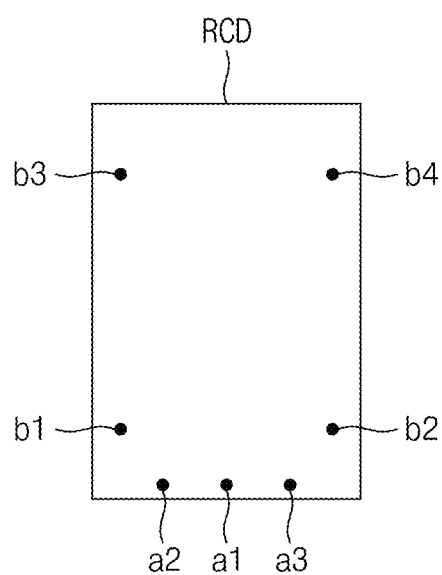
FIG. 7 is a schematic diagram illustrating terminals of a registered clock driver included in a design file of a registered clock driver according to an embodiment of the inventive concept.

FIG. 7 is a schematic diagram illustrating terminals of an RCD included in a design file of the RCD according to an embodiment of the inventive concept.

Referring to FIG. 7, the RCD may include driver input terminals a1 to a3 corresponding to the first board control signal input terminals ra1 to ra3, and first driver output terminals b1 corresponding to the first board control signal output terminals rb1 to fourth driver output terminals b4 corresponding to the fourth board control signal output terminals rb4. The driver input terminals a1 to a3 may include a driver clock signal and first and second driver chip selection signal input terminals a1, first driver command and address input terminals a2, and second driver command and address input terminals a3, the first driver output terminals b1 may include first memory command and address output terminals, a first memory clock signal terminal, and a first memory chip selection signal output terminal, the second driver output terminals b2 may include second memory command and address output terminals, a second memory clock signal terminal, and a second memory chip selection signal output terminal, the third driver output terminals b3 may include third memory command and address output terminals, a third memory clock signal terminal, and a third memory chip selection signal output terminal, and the fourth driver output terminals b4 may include fourth memory command and address output terminals, a fourth memory clock signal terminal, and a fourth memory chip selection signal output terminal.

Figure 8:
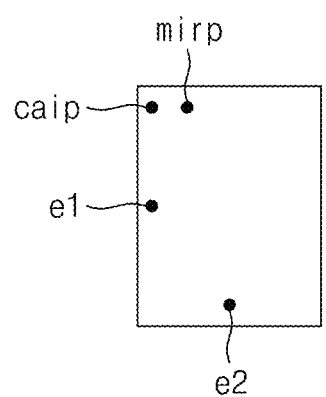
FIG. 8 is a schematic diagram illustrating terminals of a semiconductor memory device included in a design file of a semiconductor memory device according to an embodiment of the inventive concept.

FIG. 8 is a schematic diagram illustrating terminals of a semiconductor memory device included in a design file of the semiconductor memory device according to an embodiment of the inventive concept.

Referring to FIG. 8, each of the first semiconductor memory devices M11 to M15 to each of the fourth semiconductor memory devices M41 to M45 may include memory control signal terminals e1 (that is, a memory clock signal terminal, chip selection signal terminals, and memory command and address terminals), memory data terminals e2, a memory inversion command and address terminals caip, and a memory mirror command and address terminal mirp.

The memory control signal terminals e1 and the memory data terminals e2 may correspond to the first module control signal input terminals re11 and the first module data terminals re12, respectively, for each of the first semiconductor memory devices M11 to M15 in the PCB, correspond to the second module control signal input terminals re21 and the second module data terminals re22, respectively, for each of the second semiconductor memory devices M21 to M25, correspond to the third module control signal input terminals re31 and the third module data terminals re32, respectively, for each of the third semiconductor memory devices M31 to M35, and correspond to the fourth module control signal input terminals re41 and the fourth module data terminals re42, respectively, for each of the fourth semiconductor memory devices M41 to M45.

The memory inversion command and address terminal caip, and the memory mirror command and address terminal mirp may correspond to the first module inversion command and address terminal rcaip1 and the first module mirror command and address terminal rmirp1 for each of the first semiconductor memory devices M11 to M15 in the PCB to the fourth module inversion command and address terminal rcaip4 and the fourth module mirror command and address terminal rmirp4 for each of the fourth semiconductor memory devices M41 to M45.

In the memory modules 300 and 300' shown in FIGS. 4A and 4B, when a first chip selection signal CS1 is activated, the first semiconductor memory devices M11 to M15 to the fourth semiconductor memory devices M41 to M45 arranged in the front surface of the PCB may be selected to perform an operation, and when a second chip selection signal CS2 is activated, the fifth semiconductor memory devices (not shown) to the eighth semiconductor memory devices (not shown) arranged in the rear surface of the PCB may be selected to perform an operation. The memory module 300 shown in FIG. 4A may transmit and receive data through the first data terminals DQ1P to the fourth data terminals DQ4P. The memory module 300' shown in FIG. 4B may further include third data buffers (not shown) and fourth data buffers (not shown) arranged in the rear surface of the PCB and at positions corresponding to the first data buffers DB11 to DB15 and the second data buffers DB21 to DB25. The memory module 300' shown in FIG. 4B may transmit and receive data through the first data buffers DB11 to DB15 and the second data buffers DB21 to DB25, and the first data terminals DQ1P' and the second data terminals DQ2P', or transmit and receive data through the third data buffers (not shown) and the fourth data buffers (not shown), and the first data terminals DQ1P' and the second data terminals DQ2P'.

FIG. 9 is a command truth table of a semiconductor memory device according to an embodiment of the inventive concept.

Referring to FIG. 9, a refresh command REF, an all bank precharge command PREA, and a precharge command PRE may be memory command and addresses ca11, ca12, ca21, and ca22 applied during one clock cycle in response to memory chip selection signals cs11, cs12, cs21, and cs22 having "low" levels and rising edges of memory clock signals ck11, ck12, ck21, and ck22, and a deselect command DES may be the memory command and addresses ca11, ca12, ca21, and ca22 applied during one clock cycle in response to the memory chip selection signals cs11, cs12, cs21, and cs22 having "high" levels and rising edges of memory clock signals ck11, ck12, ck21, and ck2. Command signals indicating different one-cycle command and addresses may be included in ca0 to ca4 of each of 14-bit command and address ca11, ca12, ca21, and ca22.

An active command ACT, a write command WR, a read command RD, and a mode register write command MRW may be memory command and addresses ca11, ca12, ca21, and ca22 successively applied during 2 clock cycles in response to the memory chip selection signals cs11, cs12, cs21, and cs22 having "low" levels and the memory chip selection signals cs11, cs12, cs21, and cs22 having "high" levels, and rising edges of memory clock signals ck11, ck12, ck21, and ck22. Command signals indicating different two-cycle command and addresses may be included in ca0 to ca4 of each of 14-bit command and address ca11, ca12, ca21, and ca22 first applied during 2 clock cycles.

In FIG. 9, hatched portions may include a row address, a column address, and a mode setting code. For example, a row address may be applied together with the active command ACT, a column address may be applied along with a write command WR or a read command RD, and a mode setting code may be applied together with the mode setting write command MRW.

The command truth table shown in FIG. 9 may be a table according to the JEDEC specification of the DDR5 semiconductor memory device, and the command truth table used for test according to an embodiment of the inventive concept may be different from that shown in FIG. 9. However, the command truth table for test may be the same as that shown in FIG. 9 in that a 1-cycle command and address and a 2-cycle command and address are mixed and applied.

Figure 10:
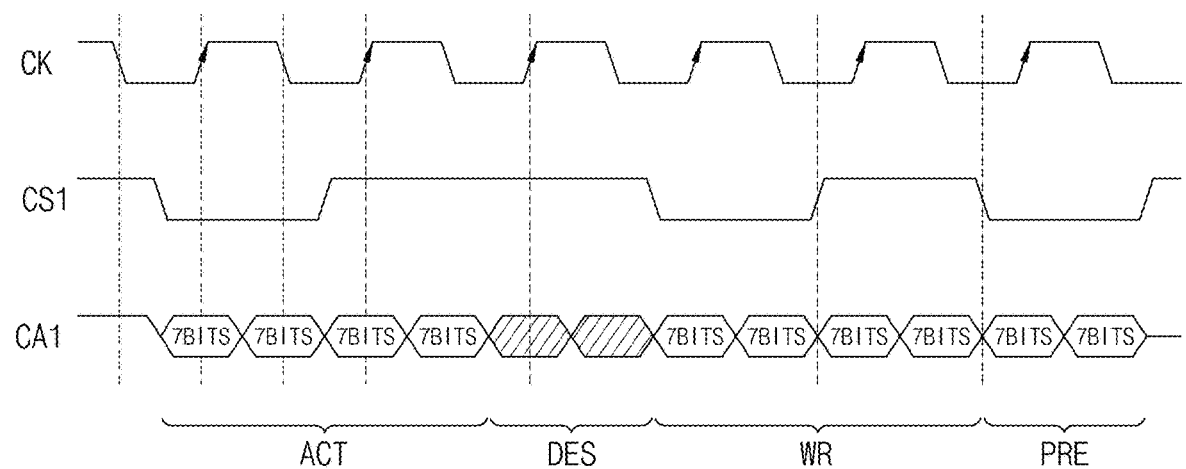
FIG. 10 is a waveform illustrating a clock signal, a first chip selection signal, and a first command and address applied to control terminals of a printed circuit board according to an embodiment of the inventive concept.

FIG. 10 is a waveform illustrating a clock signal CK, a first chip selection signal CS1, and a first command and address CA1 applied to control terminals of a PCB according to an embodiment of the inventive concept.

Referring to FIGS. 9 and 10, the active command ACT and the write command WR may be applied during 2 clock cycles. For example, a 7-bit first command and address CA1 is applied in response to a rising edge of the clock signal CK and the first chip selection signal CS1 having a "low" level, a 7-bit first command and address CA1 is applied in response to a falling edge of the clock signal CK and the first chip selection signal CS1 having the "low" level, a 7-bit first command and address CA1 is applied in response to a rising edge of the clock signal CK and the first chip selection signal CS1 having a "high" level, and a 7-bit first command and address CA1 is applied in response to a falling edge of the clock signal CK and the first chip selection signal CS1 having the "high" level. That is, a total of 28 bits of the first command and address CA1 may be applied by 7 bits at a double data rate (DDR) during 2 clock cycles.

The deselect command DES and the precharge command PRE may be applied during 1 clock cycle. For example, a 7-bit first command and address CA1 is applied in response to a rising edge of the clock signal CK and the first chip selection signal CS1 having a "high" level or the first chip selection signal CS1 having a "low" level, and a 7-bit first command and address CA1 is applied in response to a falling edge of the clock signal CK and the first chip selection signal CS1 having the "high" level or the first chip selection signal CS1 having the "low" level. That is, a total of 14 bits of the first command and address CA1 may be applied by 7 bits at a DDR during 1 clock cycle.

The second command and address CA2 may be also applied in the same manner as shown in FIG. 10 in response to the second chip selection signal CS2 and the clock signal CK.

Figure 11:
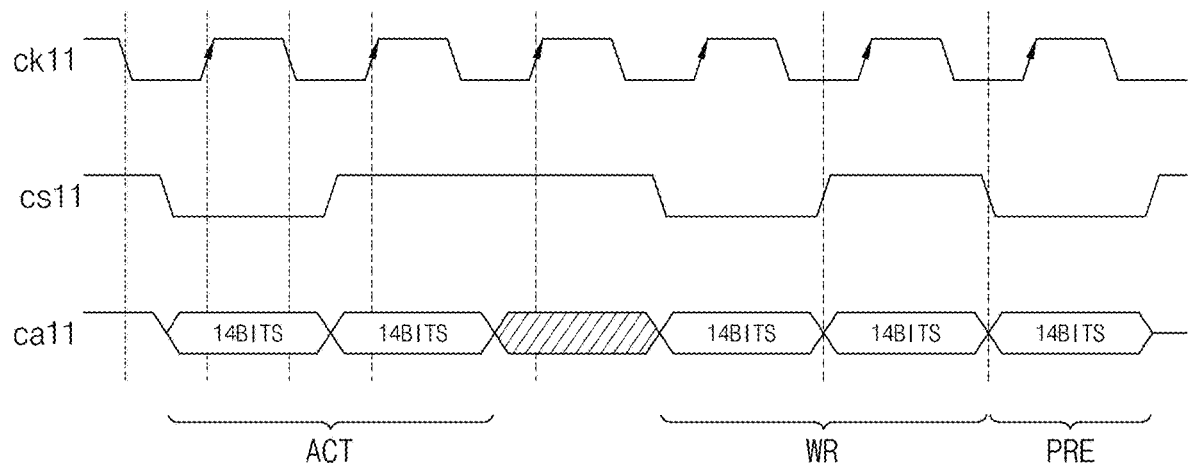
FIG. 11 is a waveform illustrating a first memory clock signal, a first memory chip selection signal, and a first memory command and address output from first driver output terminals of a registered clock driver according to an embodiment of the inventive concept.

FIG. 11 is a waveform illustrating a first memory clock signal ck11, a first memory chip selection signal cs11, and a first memory command and address ca11 output from first driver output terminals b1 of an RCD according to an embodiment of the inventive concept.

Referring to FIGS. 4A, 4B, and 9 to 11, the active command ACT and the write command WR may be applied during 2 clock cycles. The RCD may receive a 7-bit first command and address CA1 applied at a DDR in response to the clock signal CK and the first chip selection signal CS1, generate a 14-bit normal memory command and address ca11 at a single data rate (SDR) in response to a rising edge of the first memory clock signal ck11 and the first memory chip selection signal cs11 having a "low" level, and generate a 14-bit normal memory command and address ca11 at the SDR in response to the rising edge of the first memory clock signal ck11 and the first memory chip selection signal cs11 having a "high" level. That is, the RCD may convert and generate the first command and address CA1 applied at the DDR into the first memory command and address ca11 generated at the SDR.

The deselect command DES and the precharge command PRE may be applied during 1 clock cycle. The RCD may receive a 7-bit first command and address CA1 applied at the DDR in response to a rising edge of the clock signal CK and the first chip selection signal CS1 having a "high" level or the first chip selection signal CS1 having a "low" level, and generate a 14-bit first memory command and address ca11 at the SDR in response to the rising edge of the first memory clock signal ck11 and the first memory chip selection signal cs11 having the "low" level.

An operation of the registered clock driver RCD will be described below with reference to FIGS. 4A to 11.

The RCD may receive the clock signal CK, the first chip selection signal CS1, and the second chip selection signal CS2 through the driver clock signal input terminal a1, receive the 7-bit first command and address CA1 applied at the DDR through the first driver command and address input terminals a2, and receive the 7-bit second command and address CA2 applied at the DDR through the second driver command and address input terminals a3.

The RCD may output the first memory clock signal ck11, the first memory chip selection signal cs11, and the 14-bit first memory command and address ca11 (that is, the normal memory command and address) generated at the SDR to the first driver output terminals b1 in response to the clock signal CK, the first chip selection signal CS1, and the first command and address CA1, and output the second memory clock signal ck12, the second memory chip selection signal cs12, and the 14-bit second memory command and address ca12 (that is, the mirror memory command and address) generated at the SDR to the second driver output terminals b2 in response to the clock signal CK, the first chip selection signal CS1, and the first command and address CA1.

The RCD may output the third memory clock signal ck21, the third memory chip selection signal cs21, and the 14-bit third memory command and address ca21 (that is, the inversion memory command and address) generated at the SDR to the third driver output terminals b3 in response to the clock signal CK, the first chip selection signal CS1, and the second command and address CA2, and output the fourth memory clock signal ck2, the fourth memory chip selection signal cs22, and the 14-bit fourth memory command and address ca22 (that is, the mirror_inversion memory command and address) generated at the SDR to the fourth driver output terminals b4 in response to the clock signal CK, the first chip selection signal CS1, and the second command and address CA2.

FIGS. 12A to 12D are a diagram illustrating a first command and address CA1, a second command and address CA2, a first memory command and address ca11, a second memory command and address ca12, a third memory command and address ca21, and a fourth mirror memory command and address ca22 according to an embodiment of the inventive concept. The first command and address CA1 and the second command and address CA2 may be "0001000".

Referring to FIG. 12A, the RCD may generate the first memory command and address ca11, that is, the normal memory command and address, of "00010000100001" identical to the first command and address CA1.

Referring to FIG. 12B, the RCD may generate the second memory command and address ca12, that is, the mirror memory command and address, of "00100000010010" generated by mirroring the second command and address CA2.

Referring to FIG. 12C, the RCD may generate the third memory command and address ca21, that is, the inversion memory command and address, of "11101111011110" generated by inverting the first command and address CA1.

Referring to FIG. 12D, the RCD may generate the fourth memory command and address ca22, that is, the mirror_inversion memory command and address, of "11011111011101" generated by mirroring and inverting the second command and address CA2.

Figure 13:
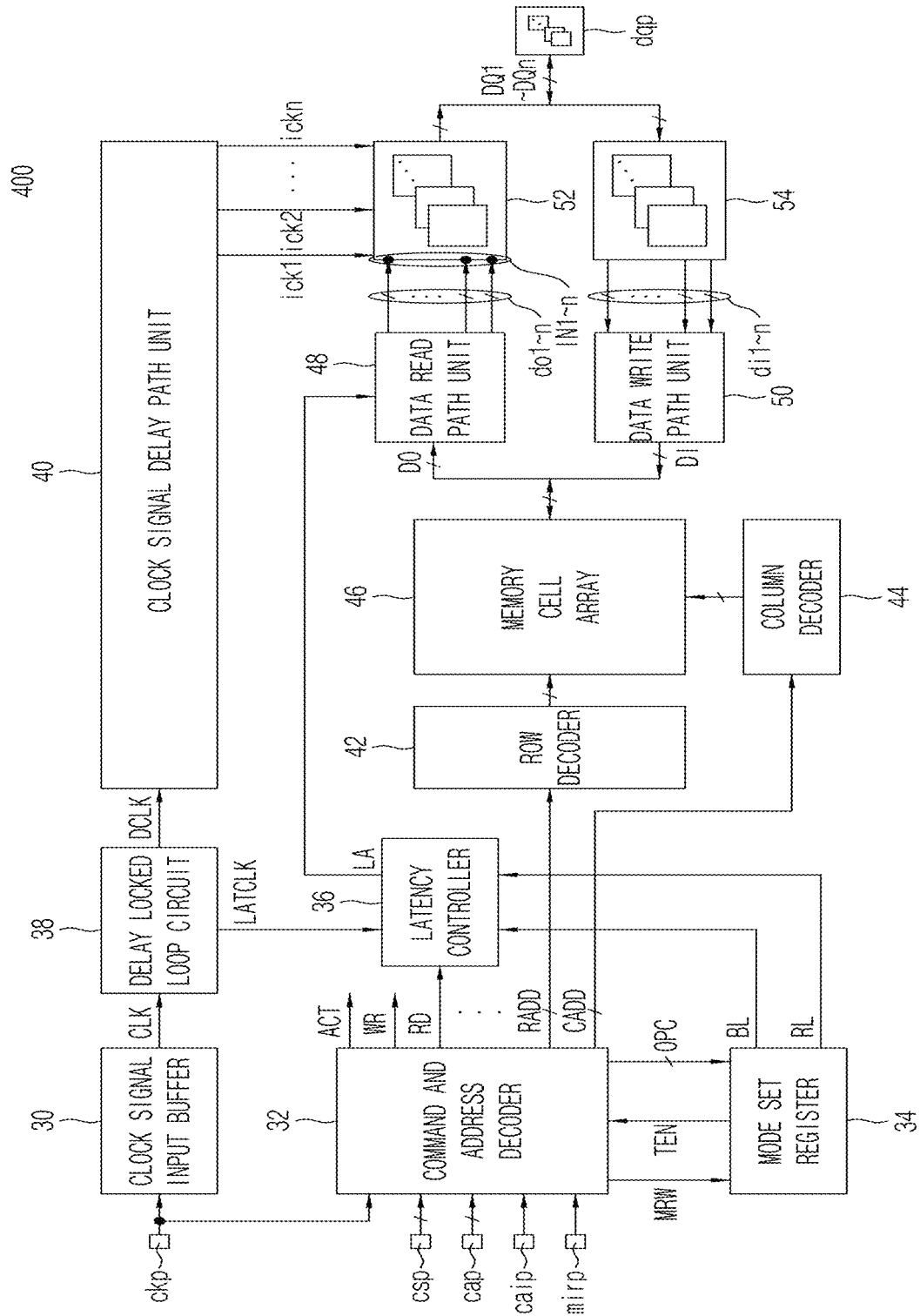
FIG. 13 is a block diagram illustrating a configuration of a semiconductor memory device included in a design file of a semiconductor memory device according to an embodiment of the inventive concept.

FIG. 13 is a block diagram illustrating a configuration of a semiconductor memory device included in a design file of the semiconductor memory device according to an embodiment of the inventive concept. The semiconductor memory device 400 may be a configuration of each of the first semiconductor memory devices M11 to M15 to the fourth semiconductor memory devices M41 to M45.

Referring to FIG. 13, the semiconductor memory device 400 may include a memory clock signal terminal ckp, a memory chip selection signal terminal csp, memory command and address terminals cap, an memory inversion command and address terminal caip, an memory mirror command and address terminal mirp, a clock signal input buffer 30, a command and address decoder 32, a mode set register 34, a latency controller 36, a delay locked loop circuit 38, a clock signal delay path unit 40, a row decoder 42, a column decoder 44, a memory cell array 46, a data read path unit 48, a data write path unit 50, a data output driver 52, and a data input driver 54. In FIG. 13, the memory clock signal terminal ckp, the memory chip selection signal terminal csp, and the memory command and address terminals cap may correspond to the memory control signal terminals e1 shown in FIG. 8, and the memory inversion command and address terminal caip and the memory mirror command and address terminal mirp may correspond to the terminals caip, mirp shown in FIG. 8.

A function of each of the blocks shown in FIG. 13 will be described below.

The clock signal input buffer 30 may buffer the first, the second, the third, or the fourth memory clock signal ck11, ck12, ck21, or ck22 to generate a buffered clock signal CLK.

The command and address decoder 32 may decode the normal, the mirror, the inversion, or the mirror_inversion memory command and address ca11, ca12, ca21, or ca22 to generate the active command ACT, the write command WR, the read command RD, and the mode register set command MRS, etc., in response to voltages applied to the memory inversion command and address terminal caip and the memory mirror command and address terminal mirp and the first, the second, the third, or the fourth memory clock signal ck11, ck12, ck21, or ck22. When a test enable signal TEN 15 deactivated, that is, during a normal operation, the command and address decoder 32 may generate commands based on the command truth table which is the same as that shown in FIG. 9. When the test enable signal TEN is activated, that is, during a test operation, the command and address decoder 32 may generate commands based on a command truth table for test which is different from that shown in FIG. 9. Further, the command and address decoder 32 may receive an address signal included in the normal, the mirror, the inversion, or the mirror_inversion memory command and address ca11, ca12, ca21, or ca22 to generate a row address RADD together with the active command ACT, to generate a column address CADD together with the write command WR or the read command RD, and to generate a mode set code OPC together with the mode register set command MRS.

The mode set register 34 may store the mode set code OPC in response to the mode register write command MRW, and set the test enable signal TEN, a latency signal RL, and a burst length BL.

The latency controller 36 may receive the read command RD in response to a latency clock signal LATCLK, and generate a latency control signal LA which is activated after the number of clock cycles corresponding to the read latency RL and deactivated after the number of clock cycles corresponding to the burst length BL.

The delay locked loop circuit 38 may receive the buffered clock signal CLK, and generate a clock signal DCLK delay-locked to the first, the second, the third, or the fourth memory clock signal ck11, ck12, ck21, or ck22, and further generate the latency clock signal LATCLK.

The clock signal delay path unit 40 may receive and delay the clock signal DCLK, and generate internal clock signals ick1 to ickn locked to the first, the second, the third, or the fourth memory clock signal ck11, ck12, ck21, or ck22.

The row decoder 42 may decode the row address RADD, and generate a plurality of word line selection signals wl.

The column decoder 44 may decode the column address CADD, and generate a plurality of column selection signals cs1.

The memory cell array 46 may include a plurality of memory cells (not shown), and output read data DO from memory cells selected in response to the plurality of word line selection signals wl and the plurality of column selection signals cs1 or store write data DI in the selected memory cells.

The data read path unit 48 may convert the read data DO in series, and generate n pieces of output data do1 to don. The n pieces of output data do1 to don may be generated during an activation period of the latency control signal LA. For example, when 8n-bit read data is input, n pieces of output data do1 to don may be output eight times by 1 bit The data write path unit 50 may convert n pieces of input data di1 to din in parallel, and generate the write data DI. For example, when the n pieces of input data di1 to din is input eight times by 1 bit, 8n-bit write data DI may be generated.

n data output drivers 52 may be connected to the n data terminals dqp, respectively, drive the n pieces of output data do1 to don in response to the internal clock signals ick1 to ickn, respectively, and generate n pieces of data DQ1 to DQn, respectively. During the test operation on the memory module, the test pattern data and the read data generated through n input nodes IN of the n data output drivers 52 may be compared.

n data input drivers 54 may be connected to the n data terminals dqp, respectively, drive the n pieces of data DQ1 to DQn, respectively, and generate the n pieces of input data di1 to din, respectively.

FIG. 14 is a diagram illustrating an arrangement of a memory cell array according to an embodiment of the inventive concept. The memory cell array 46 may include memory cell array blocks MBLK and sense amplifier blocks SBLK which are alternately arranged. Each of the memory cell array blocks MBLK may include sub word line drivers SWD and sub memory cell array blocks SMCA which are alternately arranged, and each of the sense amplifier blocks SBLK may include conjunction regions CJ and sense amplifier unit SA which are alternately arranged. Although not shown, each of the sub memory cell array blocks SMCA may include memory cells, each of the sub word line drivers SWD may include a word line driver, and each of the sense amplifier unit SA may include a sense amplifier.

FIG. 15 is a table for describing an operation of a command and address decoder of a semiconductor memory device according to an embodiment of the inventive concept.

Referring to FIG. 15, an operation of the command and address decoder 32 may be differ according to voltages applied to the memory inversion command and address terminal caip and the memory mirror command and address terminal mirp of the semiconductor memory device shown in FIG. 13.

Referring to FIG. 4A to FIG. 15, the module inversion command and address terminal rcaip1 and the module mirror command and address terminal rmirp1 of the PCB corresponding to the memory inversion command and address terminal caip and the memory mirror command and address terminal mirp of each of the first semiconductor memory devices M11 to M15 may be connected to a ground voltage VSS, and the command and address decoder 32 of each of the first semiconductor memory devices M11 to M15 may decode the first memory command and address ca11. The module inversion command and address terminal rcaip2 and the module mirror command and address terminal rmirp2 for each of the second semiconductor memory devices M21 to M25 may be connected to a ground voltage VSS and a power supply voltage VDD, respectively, and the command and address decoder 32 of each of the second semiconductor memory devices M21 to M25 may mirror and decode the second memory command and address ca12. The module inversion command and address terminal rcaip3 and the module mirror command and address terminal rmirp3 for each of the third semiconductor memory devices M31 to M35 may be connected to the power supply voltage VDD and the ground voltage VSS, respectively, and the command and address decoder 32 of each of the third semiconductor memory devices M31 to M35 may invert and decode the third memory command and address ca21. The module inversion command and address terminal rcaip4 and the module mirror command and address terminal rmirp4 for each of the fourth semiconductor memory devices M41 to M45 may be connected to the power supply voltage VDD, and the command and address decoder 32 of each of the fourth semiconductor memory devices M41 to M45 may mirror, invert and decode the fourth memory command and address ca22.

Figure 16:
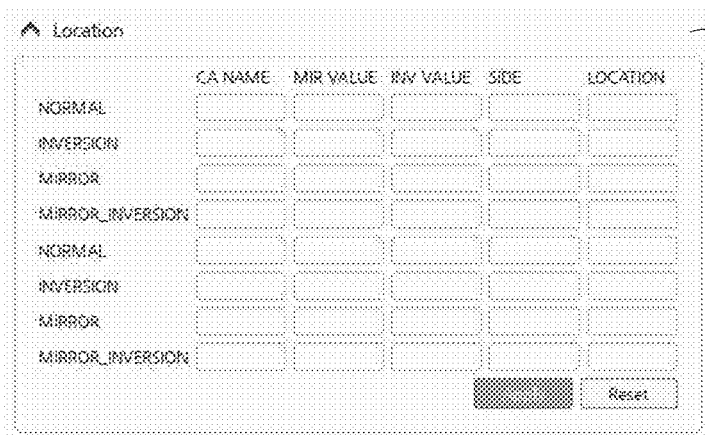
FIGS. 16 to 18 are diagrams for describing setting a configuration and an arrangement of components of a memory module through a graphic user interface according to an embodiment of the inventive concept.
Figure 17:
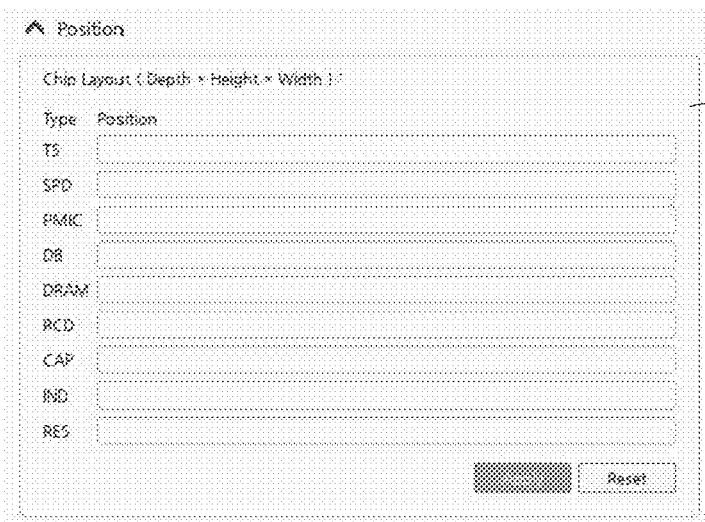
Figure 18:
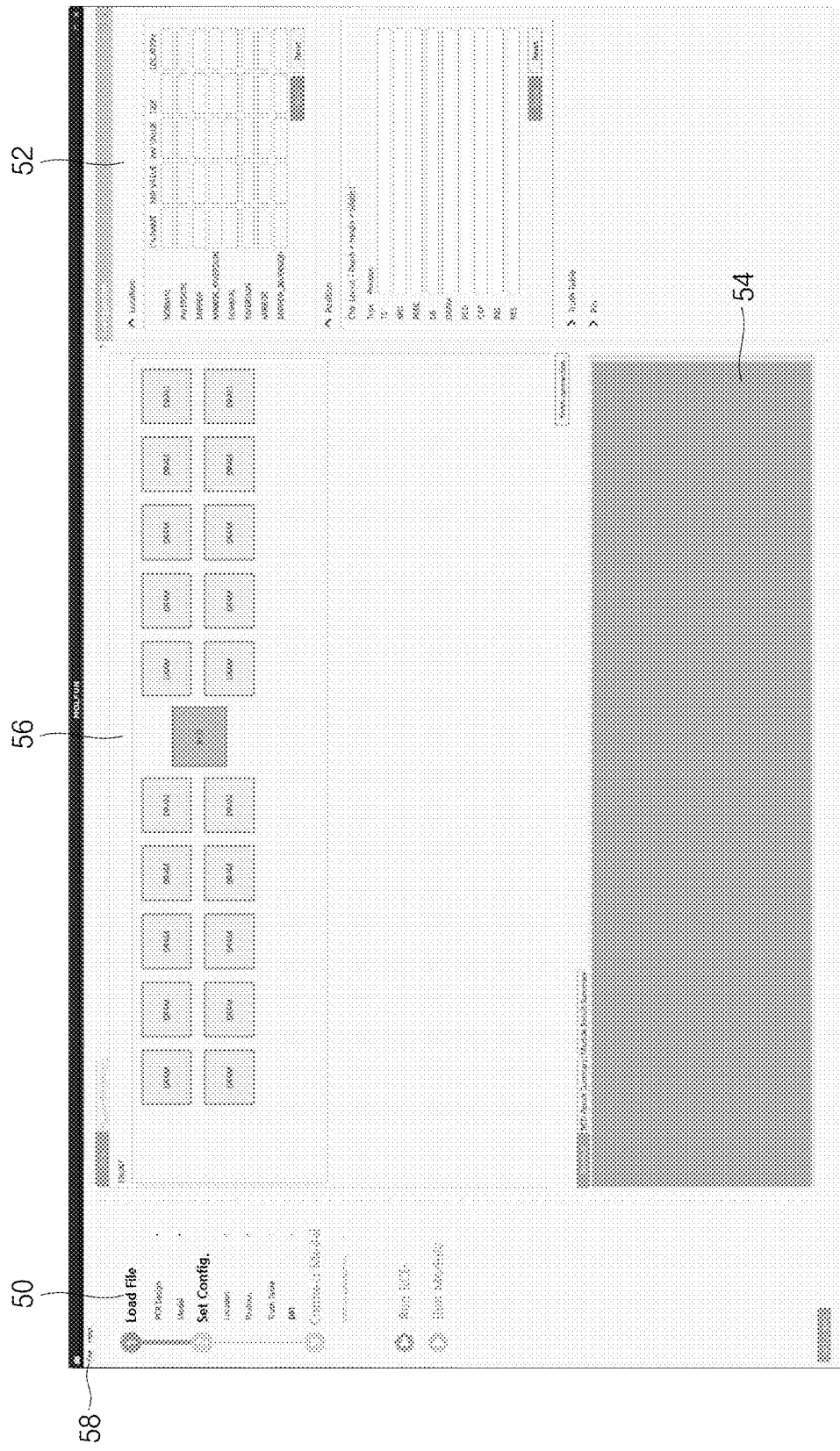

FIGS. 16 to 18 are diagrams for describing setting a configuration and an arrangement of components of a memory module design through a graphic user interface according to an embodiment of the inventive concept.

Referring to FIG. 3 to FIG. 16, by selecting the location tab 74 of the configuration window 52 and using location set items (NORMAL, INVERSION, MIRROR, MIRROR_INVERSION items) shown in FIG. 16, values (voltages) and locations of the first to the fourth module inversion command and address terminals rcaip1 to rcaip4 and the first to the fourth module mirror command and address terminals rmirp1 to rmirp4 of the PCB connected to the memory inversion command and address terminal caip and the memory mirror command and address terminal mirp of each of the first semiconductor memory devices M11 to M15 to the fourth semiconductor memory devices M41 to M45 may be set.

Referring to FIG. 3 to FIG. 18, by selecting the position tab 76 of the configuration window 52 and using the position tab 76 shown in FIG. 17, positions of each of the first semiconductor memory devices M11 to M15 to the fourth semiconductor memory devices M41 to M45 of the PCB and a position of the RCD of the PCB may be set. When the position setting is completed, as shown in FIG. 18, the memory module may be displayed in the main window 56 according to the configuration and arrangement setting.

Referring to FIG. 4A to FIG. 18, the RCD is arranged in a central region of the front surface of the PCB, the first semiconductor memory devices M11 to M15 may be arranged in a row in a lower left region of the RCD, the second semiconductor memory devices M21 to M25 may be arranged in a row in a lower right region of the registered clock driver RCD, the third semiconductor memory devices M31 to M35 may be arranged in a row in an upper left region of the RCD, and the fourth semiconductor memory devices M41 to M45 may be arranged in a row in an upper right region of the RCD.

Referring to FIG. 3 to FIG. 18, the command truth table for test of the memory module may be displayed by selecting a command truth table tab Truth Table of the configuration window 52.

Referring to FIG. 3 to FIG. 18, terminals related to a test result may be set by selecting a pin tab PIN of the configuration window 52. For example, inner nodes IN1 to INn of each of the first semiconductor memory devices M11 to M15 to the fourth semiconductor memory devices M41 to M45 may be set. When the configuration setting step Set Config. is completed, a color of the configuration setting step Set Config. of the step monitor window 50 may be changed.

Figure 19:
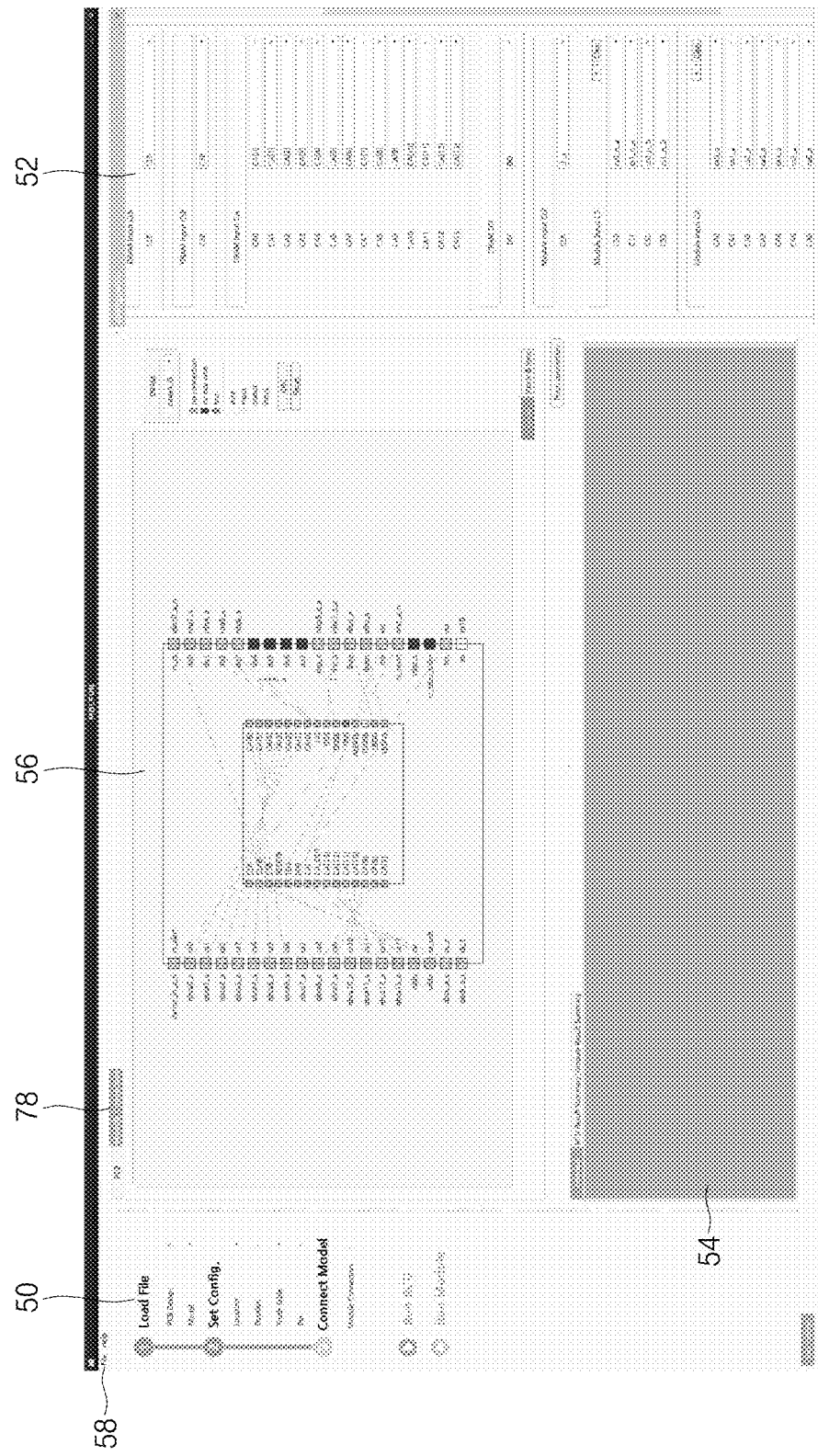
FIG. 19 is a diagram for describing setting a connection between components of a memory module through a graphic user interface according to an embodiment of the inventive concept.

FIG. 19 is a diagram for describing setting a connection between components of a memory module through a GUI according to an embodiment of the inventive concept.

Referring to FIG. 3 to FIG. 19, by selecting a module connection tab Module Connection of the main window 56 and using the module connection tab Module Connection shown in FIG. 19, a connection among the terminals of the PCB, the terminals of the first semiconductor memory devices M11 to M15 to the fourth semiconductor memory devices M41 to M45, and the terminals of the RCD may be set. When the connection model step Connect Module is completed, a color of the connection module step Connect Module of the step monitor window 50 may be changed.

Referring to FIG. 4A to FIG. 19, the connection model step Connect Module may be used to set the driver input terminals of the RCD to be connected to the board control signal input terminals conp of the PCB, and the first driver output terminals b1 to the fourth driver output terminals b4 to be connected to the first board control signal output terminals rb1 to the fourth board control signal output terminals rb4 of the PCB, respectively. Further, the connection model step Connect Module may be used to set the memory control signal terminals e1 and the memory data terminals e2 of each of the first semiconductor memory devices M11 to M15 to be connected to the first module control signal input terminals re11 and the first module data terminals re12 for each of the first semiconductor memory devices M11 to M15 of the PCB, respectively. The connection model step Connect Module may be used to set the memory control signal terminals e1 and the memory data terminals e2 of each of the second semiconductor memory devices M21 to M25 to be connected to the second module control signal input terminals re21 and the second module data terminals re22 for each of the second semiconductor memory devices M21 to M25 of the PCB, respectively. The connection model step Connect Module may be used to set the memory control signal terminals e1 and the memory data terminals e2 of each of the third semiconductor memory devices M31 to M35 to be connected to the third module control signal input terminals re31 and the third module data terminals re32 for each of the third semiconductor memory devices M31 to M35 of the PCB, respectively. The connection model step Connect Module may be used to set the memory control signal terminals e1 and the memory data terminals e2 of each of the fourth semiconductor memory devices M41 to M45 to be connected to the fourth module control signal input terminals re41 and the fourth module data terminals re42 for each of the fourth semiconductor memory devices M41 to M45 of the PCB, respectively.

The processor 4 shown in FIG. 1 may create the memory module for testing in accordance with the above-described settings.

The simulation method of verifying the operation of the semiconductor memory devices of the memory module at a design level may previously perform verification on the design file of the RCD before the test on the memory module is performed.

Referring to FIG. 19, the test on the design file of the RCD may be executed by selecting a test run button Run RCD of the step monitor window 50 to perform the test on the RCD.

The test on the design file of the RCD may include applying the clock signal CK, the first chip selection signal CS1, and the first command and address CA1 shown in FIG. 10 to the clock signal terminal CKP, the first and the second chip selection signal terminals CSP, and the first command and address terminals CA1P and the second command and address terminals CA2P, respectively. When the first memory clock signal ck11, the first memory chip selection signal cs11, and the normal memory command and address ca11 shown in FIG. 11 is generated through the first driver output terminals b1, it may be determined that the RCD operates normally. Further, it may be verified whether the second memory clock signal ck12, the second memory chip selection signal cs12, and the mirror memory command and address ca12 is output normally through the second driver output terminals b2. When it is verified that the RCD operates normally, the test on the memory module may be performed.

Referring to FIG. 19, a RCD test result on the RCD may be displayed by selecting an RCD result summary tab RCD Result Summary of the result window 54.

The test on the memory module may include applying the clock signal CK, the first chip selection signal CS1, the second chip selection signal CS2, and the first command and address CA1 and the second command and address CA2 corresponding to the write command WR to the control signal terminals CONP of the PCB, and applying test pattern data to the first data terminals DQ1P and the second data terminals DQ2P to perform a write operation. The write operation may sequentially write the same test pattern data to every memory cell included in the memory cell array 46 shown in FIG. 14 by changing the row address applied together with the active command ACT and the column address applied together with the write command WR, or sequentially write the same test pattern data to only specific memory cells (for example, memory cells adjacent to the sub word line driver SWD and the sense amplification unit SA among the memory cells (not shown) of the sub memory cell array block SMCA of the memory cell array 46 shown in FIG. 14, that is, memory cells with high probability of failure). Next, the test on the memory module may include applying the clock signal CK, the first chip selection signal CS1, the second chip selection signal CS2, and the first command and address CA1 and the second command and address CA2 correspond to the read command RD to the control signal terminals CONP of the PCB to perform a read operation. The read operation may sequentially read data from every memory cell included in the memory cell array 46 shown in FIG. 14 by changing the row address applied together with the active command ACT and the column address applied together with the read command RD, or sequentially read data from only the specific memory cells. During the read operation, it may be determined whether the memory cells operate normally by comparing the test pattern data and data generated at the n input nodes IN1 to INn of the n data output drives 52 shown in FIG. 13. That is, it may be determined that the memory cells of the memory cell array 46 shown in FIG. 14 are normal/defective. Such an operation may be repeatedly performed by changing the test pattern data.

In addition, the test on the memory module may include determining whether the RCD operates normally by comparing the first chip selection signal CS1, the second chip selection signal CS2, the first command and address CA1, and the second command and address CA2 applied to the driver input terminals conp of the RCD and the first memory chip selection signal to the fourth memory chip selection signal cs11, cs12, cs21, cs22, and the normal, the mirror, the inversion, and the mirror_inversion memory command and addresses ca11, ca12, ca21, ca22, generated from the first driver output terminals b1 to the fourth driver output terminals b4.

According to embodiments of the inventive concept, the test on the RCD may be performed before performing the test on the semiconductor memory devices, when the RCD operates normally, the test on the semiconductor memory device may be performed. In addition, the test result may be created by comparing the test pattern data and the read data of the inner nodes of the semiconductor memory device. Accordingly, it may be possible to verify the operation of the semiconductor memory device accurately.

For example, in the memory module shown in FIGS. 4A and 4B, it may be unclear whether the read data output through the first data terminals DQ1P is read data output from the first semiconductor memory devices M11 to M15 arranged on the front surface of the PCB or read data output from the fifth semiconductor memory devices (not shown) arranged on the rear surface of the PCB. In addition, it may be unclear whether the read data output through the second data terminals DQ2P to the fourth data terminals DQ4P is read data output from the second semiconductor memory devices M11 to M15 to the fourth semiconductor memory devices M41 to M45 arranged on the front surface of the PCB or read data output from the sixth semiconductor memory devices (not shown) to the eighth semiconductor memory devices (not shown) arranged on the rear surface of the PCB. In this case, the simulation method according to the embodiments of the inventive concept may compare the test pattern data and the read data of the inner nodes IN1 to INn of each of the first semiconductor memory devices M11 to M15 to each of the eighth semiconductor memory devices (not shown), and thus perform a more accurate verification.

Referring to FIG. 19, the test result for the memory module may be displayed by selecting the module result summary tab Module Result Summary of the result window 54.

According to the embodiments of the present disclosure, operations of the semiconductor memory devices of the memory module may be verified at a design level before being assembled into the memory module, so that design problems of the semiconductor memory device can be identified in advance and corrected in the design. Accordingly, defects of the memory module after being assembled into the memory module may be prevented, and thus the yield may be improved.

Also, according to embodiments of the present disclosure, a test time may be reduced by performing the test on only the specific memory cells without performing the test on every memory cell having the same functional operation of each of the semiconductor memory devices.

While the embodiments of the inventive concept have been described with reference to the accompanying drawings, it will be understood by those skilled in the art that various modifications may be made without departing from the scope of the inventive concept and without changing essential features thereof. Therefore, the above-described embodiments should be considered in a descriptive sense only and not for the purposes of limitation.

What is claimed is:

1. A simulating method comprising:
   loading a design file of a printed circuit board (PCB), a design file of a registered clock driver (RCD), a design file of a semiconductor memory device, a design file of a memory module, and a test program, through a graphic user interface (GUI);
   setting a configuration and an arrangement of the RCD based on the design file of the RCD, and a configuration and an arrangement of first semiconductor memory devices to fourth semiconductor memory devices based on the design file of the semiconductor memory device, on the PCB, through the GUI;
   setting a connection between board control signal terminals of the PCB and driver input terminals of the RCD, a connection between first board control output terminals of the PCB and first driver output terminals of the RCD, a connection between second board control output terminals of the PCB and second driver output terminals of the RCD, a connection between third board control output terminals of the PCB and third driver output terminals of the RCD, and a connection between fourth board control output terminals of the PCB and fourth driver output terminals of the RCD, through the GUI;
   in response to a RCD test execution command applied through the GUI, executing the test program to apply control signals to control signal terminals of the PCB based on a command truth table for test, to compare the applied control signals and control signals output through first driver output terminals of the RCD, and to create an RCD test result; and
   in response to the RCD test result indicating that the RCD operates normally, performing a test on the memory module.

2. The simulation method according to claim 1, further comprising:
   setting a connection between first module data terminals for each of the first semiconductor memory devices of the PCB and first memory data terminals of each of the first semiconductor memory devices, a connection between second module data terminals for each of the second semiconductor memory devices of the PCB and second memory data terminals of each of the second semiconductor memory devices, a connection between third module data terminals for each of the third semiconductor memory devices of the PCB and third memory data terminals of each of the third semiconductor memory devices, and a connection between fourth module data terminals for each of the fourth semiconductor memory devices of the PCB and fourth memory data terminals of each of the fourth semiconductor memory devices, through the GUI, and
   wherein, in response to a module test execution command applied through the GUI, executing the test program to apply the control signals to the control signal terminals, to apply test pattern data to first data terminals to fourth data terminals of the PCB, to perform a write operation on a plurality of memory cells of each of the first semiconductor memory devices to the fourth semiconductor memory devices, to perform a read operation of reading data written to the plurality of memory cells of each of the first semiconductor memory devices to the fourth semiconductor memory devices, and to compare the test pattern data and read data output through the first memory data terminals of the first semiconductor memory devices to the fourth memory data terminals of the fourth semiconductor memory devices or read data of inner nodes of each of the first semiconductor memory devices to each of the fourth semiconductor memory devices, and to create a module test result.

3. The simulation method according to claim 2, further comprising:
   setting voltages of a module inversion command and address signal terminal and a module mirror command and address signal terminal of the PCB corresponding to a memory inversion command and address signal terminal and a memory mirror command and address signal terminal of each of the first semiconductor memory devices to the fourth semiconductor memory devices, through the GUI.

4. The simulation method according to claim 3, wherein each of the first semiconductor memory devices to the fourth semiconductor memory devices comprises a memory cell array comprising the plurality of memory cells, and
   the write operation and the read operation are performed on all of the plurality of memory cells or on specific memory cells among the plurality of memory cells.

5. The simulation method according to claim 3, wherein the first semiconductor memory devices to the fourth semiconductor memory devices comprises data output drivers connected to the first memory data terminals to the fourth memory data terminals, respectively, and configured to drive the read data of the inner nodes.

6. The simulation method according to claim 3, wherein the control signals applied to the control signal terminals of the PCB include a clock signal, a first chip selection signal, a second chip selection signal, and a first command and address and a second command and address,
   a first memory clock signal, a first memory chip selection signal, and a normal memory command and address are generated at the first driver output terminals,
   a second memory clock signal, a second memory chip selection signal, and an inversion memory command and address are generated at the second driver output terminals,
   a third memory clock signal, a third memory chip selection signal, and a mirror memory command and address are generated at the third driver output terminals, and
   a fourth memory clock signal, a fourth memory chip selection signal, and a mirror_inversion memory command and address are generated at the fourth driver output terminals,
   wherein the first command and address and the second command and address are applied at a double data rate (DDR), and
   wherein the normal memory command and address, the inversion memory command and address, the mirror memory command and address, and the mirror_inversion memory command and address are generated at a single data rate (SDR), and comprise 1-cycle or 2-cycle command and address.

7. The simulation method according to claim 6, wherein the RCD test result comprises the normal memory command and address and the mirror memory command and address.

8. The simulation method according to claim 6, wherein the module test result comprises the test pattern data, the read data, the normal memory command and address, the mirror memory command and address, the inversion memory command and address, and the mirror_inversion memory command and address.

9. The simulation method according to claim 3, wherein each of the first semiconductor memory devices to the fourth semiconductor memory devices is a DDR5 dynamic random access memory (DRAM) device.

10. A simulation system comprising:
a processor configured to execute a simulation program when a simulation program execution command is applied, and create a graphic user interface (GUI);
a storage configured to store a design file of a printed circuit board (PCB), a design file of a registered clock driver (RCD), and a design file of a semiconductor memory device, a design file of a memory module, and a command truth table;
a main memory configured to load the simulation program; and
a display configured to display the GUI,
wherein the processor loads the design file of the PCB, the design file of the RCD, and the design file of the semiconductor memory device to the main memory, in response to the design file of the PCB, the design file of the RCD, and the design file of the semiconductor memory device, the design file of the memory module, and a test program, stored in the storage, being selected through the GUI,
wherein the processor creates the memory module for testing the RCD, in response to a configuration and an arrangement of the RCD based on the design file of the RCD, and a configuration and an arrangement of first semiconductor memory devices to fourth semiconductor memory devices based on the design file of the semiconductor memory device, on the PCB, being set, and a connection between board control signal terminals of the PCB and driver input terminals of the RCD, a connection between first board control output terminals of the PCB and first driver output terminals of the RCD, a connection between second board control output terminals of the printed circuit board and second driver output terminals of the RCD, a connection between third board control output terminals of the PCB and third driver output terminals of the RCD, and a connection between fourth board control output terminals of the PCB and fourth driver output terminals of the RCD, being set, through the GUI; and
wherein the processor executes the test program to apply control signals to control signal terminals of the PCB based on the command truth table, to compare the applied control signals and control signals output through first driver output terminals of the RCD, and to create an RCD test result, in response to a RCD test execution command being applied through the GUI.

11. The simulation system according to claim 10, wherein a connection between first module data terminals for each of the first semiconductor memory devices of the PCB and first memory data terminals of each of the first semiconductor memory devices, a connection between second module data terminals for each of the second semiconductor memory devices of the PCB and second memory data terminals of each of the second semiconductor memory devices, a connection between third module data terminals for each of the third semiconductor memory devices of the PCB and third memory data terminals of each of the third semiconductor memory devices, and a connection between fourth module data terminals for each of the fourth semiconductor memory devices of the PCB and fourth memory data terminals of each of the fourth semiconductor memory devices, are further set, through the GUI, and
wherein, in response to the RCD operating normally and a module test execution command applied through the GUI, the processor executes the test program to apply the control signals to the control signal terminals, to apply test pattern data to first data terminals to fourth data terminals of the PCB, to perform a write operation on a plurality of memory cells of each of the first semiconductor memory devices to the fourth semiconductor memory devices, to perform a read operation of reading data written to the plurality of memory cells of each of the first semiconductor memory devices to the fourth semiconductor memory devices, and to compare the test pattern data and read data output through the first memory data terminals of the first semiconductor memory devices to the fourth memory data terminals of the fourth semiconductor memory devices or read data of inner nodes of each of the first semiconductor memory devices to the fourth semiconductor memory devices, and to create a module test result.

12. The simulation system according to claim 11, wherein voltages of a module inversion command and address signal terminal and a module mirror command and address signal terminal of the PCB corresponding to a memory inversion command and address signal terminal and a memory mirror command and address signal terminal of each of the first semiconductor memory devices to the fourth semiconductor memory devices, are further set, through the GUI.

13. The simulation system according to claim 12, wherein each of the first semiconductor memory devices to the fourth semiconductor memory devices comprises a memory cell array comprising the plurality of memory cells, and
wherein the write operation and the read operation are performed on all of the plurality of memory cells or on specific memory cells among the plurality of memory cells.

14. The simulation system according to claim 12, wherein the first semiconductor memory devices to the fourth semiconductor memory devices comprises data output drivers connected to the first memory data terminals to the fourth memory data terminals, respectively, and configured to drive the read data of the inner nodes.

15. The simulation system according to claim 12, wherein the control signals applied to the control signal terminals of the PCB include a clock signal, a first chip selection signal, a second chip selection signal, a first command and address and a second command and address,
a first memory clock signal, a first memory chip selection signal, and a normal memory command and address are generated at the first driver output terminals,
a second memory clock signal, a second memory chip selection signal, and an inversion memory command and address are generated at the second driver output terminals,
a third memory clock signal, a third memory chip selection signal, and a mirror memory command and address are generated at the third driver output terminals, and
a fourth memory clock signal, a fourth memory chip selection signal, and a mirror_inversion memory command and address are generated at the fourth driver output terminals,
wherein the first command and address and the second command and address are applied at a double data rate (DDR), and
wherein the normal memory command and address, the inversion memory command and address, the mirror memory command and address, and the mirror_inversion memory command and address are generated at a single data rate (SDR), and comprise 1-cycle or 2-cycle command and address.

16. The simulation system according to claim 15, wherein the RCD test result comprises the normal memory command and address and the mirror memory command and address.

17. The simulation system according to claim 16, wherein the module test result comprises the test pattern data, the read data, the normal memory command and address, the mirror memory command and address, the inversion memory command and address, and the mirror_inversion memory command and address.

18. The simulation system according to claim 12, wherein each of the first semiconductor memory devices to the fourth semiconductor memory devices is a DDR5 dynamic random access memory (DRAM) device.

\* \* \* \* \*